United States Patent
Mula et al.

(10) Patent No.: US 12,231,343 B2
(45) Date of Patent: Feb. 18, 2025

(54) HEAD-OF-QUEUE BLOCKING FOR MULTIPLE LOSSLESS QUEUES

(71) Applicant: MELLANOX TECHNOLOGIES, LTD., Yokneam (IL)

(72) Inventors: Liron Mula, Ramat Gan (IL); Lion Levi, Yavne (IL); Yuval Shpigelman, Netanya (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/902,936

(22) Filed: Sep. 5, 2022

(65) Prior Publication Data
US 2022/0417161 A1 Dec. 29, 2022

Related U.S. Application Data

(63) Continuation of application No. 16/783,184, filed on Feb. 6, 2020, now Pat. No. 11,470,010.

(51) Int. Cl.
*H04L 47/26* (2022.01)
*H04L 47/10* (2022.01)
(Continued)

(52) U.S. Cl.
CPC .......... *H04L 47/26* (2013.01); *H04L 47/2433* (2013.01); *H04L 47/30* (2013.01); *H04L 47/39* (2013.01); *H04L 47/6205* (2013.01)

(58) Field of Classification Search
CPC ..... H04L 47/2433; H04L 47/30; H04L 47/26; H04L 47/39; H04L 47/6205
See application file for complete search history.

(56) References Cited

U.S. PATENT DOCUMENTS

| 5,014,265 A | 5/1991 | Hahne et al. |
| 5,235,642 A | 10/1993 | Wobber et al. |

(Continued)

FOREIGN PATENT DOCUMENTS

| CN | 1379569 A | 11/2002 |
| EP | 0706298 A2 | 4/1996 |

(Continued)

OTHER PUBLICATIONS

U.S. Appl. No. 17/516,731 Office Action dated Jun. 16, 2023.
(Continued)

*Primary Examiner* — Redentor Pasia
(74) *Attorney, Agent, or Firm* — Meitar Patents Ltd.; Daniel Kligler

(57) ABSTRACT

A network element includes a transmit-queue for transmitting packets from at least two sources, each source having a predefined priority level, to a headroom buffer in a peer network element. Flow-control circuitry receives from the peer network element signaling that indicates a number of credits for transmitting packets to the peer network element, manages a current number of credits available for transmission from the transmit-queue, responsive to the signaling, selects a threshold priority based on the current number of credits for the transmit-queue; and transmits packets associated with data sources of the transmit-queue that are higher in priority than the threshold priority, and refrain from transmitting other packets associated with the transmit-queue.

13 Claims, 5 Drawing Sheets

(51) Int. Cl.
*H04L 47/2425* (2022.01)
*H04L 47/30* (2022.01)
*H04L 47/62* (2022.01)

(56) References Cited

U.S. PATENT DOCUMENTS

| | | |
|---|---|---|
| 5,367,520 A | 11/1994 | Cordell |
| 5,541,912 A | 7/1996 | Choudhury et al. |
| 5,574,885 A | 11/1996 | Denzel et al. |
| 5,790,522 A | 8/1998 | Fichou et al. |
| 5,917,947 A | 6/1999 | Ishida et al. |
| 6,108,713 A | 8/2000 | Sambamurthy et al. |
| 6,154,446 A | 11/2000 | Kadambi et al. |
| 6,160,814 A | 12/2000 | Ren et al. |
| 6,169,748 B1 | 1/2001 | Barbas et al. |
| 6,178,448 B1 | 1/2001 | Gray et al. |
| 6,219,728 B1 | 4/2001 | Yin |
| 6,324,165 B1 | 11/2001 | Fan et al. |
| 6,347,337 B1 | 2/2002 | Shah et al. |
| 6,456,590 B1 | 11/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,594,263 B1 | 7/2003 | Martinsson et al. |
| 6,606,666 B1 | 8/2003 | Bell et al. |
| 6,633,395 B1 | 10/2003 | Tuchitoi et al. |
| 6,657,955 B1 | 12/2003 | Bonneau et al. |
| 6,678,277 B1 | 1/2004 | Wils et al. |
| 6,687,254 B1 | 2/2004 | Ho et al. |
| 6,771,654 B1 | 8/2004 | Sang et al. |
| 6,859,435 B1 | 2/2005 | Lee et al. |
| 6,895,015 B1 | 5/2005 | Chiang et al. |
| 6,922,408 B2 | 7/2005 | Bloch et al. |
| 6,973,555 B2 | 12/2005 | Fujiwara et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,215,641 B1 | 5/2007 | Bechtolsheim et al. |
| 7,321,553 B2 | 1/2008 | Prasad et al. |
| 7,324,442 B1 | 1/2008 | Pan et al. |
| 7,327,749 B1 | 2/2008 | Mott |
| 7,330,426 B2 | 2/2008 | Berzosa et al. |
| 7,334,065 B1 | 2/2008 | Rose et al. |
| 7,346,059 B1 | 3/2008 | Gamer et al. |
| 7,529,245 B1 | 5/2009 | Muller et al. |
| 7,590,058 B1 | 9/2009 | Cherchali et al. |
| 7,609,636 B1 | 10/2009 | Mott |
| 7,630,306 B2 | 12/2009 | Chuang |
| 7,680,139 B1 | 3/2010 | Jones et al. |
| 7,738,454 B1 | 6/2010 | Panwar et al. |
| 7,747,086 B1 | 6/2010 | Hobbs et al. |
| 7,773,621 B2 | 8/2010 | Jensen |
| 7,773,622 B2 | 8/2010 | Schmidt et al. |
| 7,778,168 B1 | 8/2010 | Rodgers et al. |
| 7,813,348 B1 | 10/2010 | Gupta et al. |
| 7,821,939 B2 | 10/2010 | Decusatis et al. |
| 7,835,380 B1 | 11/2010 | Aloni et al. |
| 7,853,738 B2 | 12/2010 | Pothireddy et al. |
| 7,856,026 B1 | 12/2010 | Finan et al. |
| 7,872,973 B2 | 1/2011 | Sterne et al. |
| 7,894,343 B2 | 2/2011 | Chao et al. |
| 7,924,708 B2 | 4/2011 | Spink |
| 7,936,770 B1 | 5/2011 | Frattura et al. |
| 8,060,644 B1 | 11/2011 | Michailidis et al. |
| 8,078,743 B2 | 12/2011 | Sharp et al. |
| 8,125,902 B2 | 2/2012 | Rochon et al. |
| 8,149,710 B2 | 4/2012 | Bergamasco et al. |
| 8,213,308 B2 * | 7/2012 | Godbole ............ H04L 47/267 370/235 |
| 8,270,295 B2 | 9/2012 | Kendall et al. |
| 8,274,971 B2 | 9/2012 | Battle et al. |
| 8,345,548 B2 | 1/2013 | Gusat et al. |
| 8,352,648 B1 | 1/2013 | Puranik |
| 8,473,693 B1 | 6/2013 | Muppalaneni et al. |
| 8,478,811 B2 | 7/2013 | Garg et al. |
| 8,565,092 B2 | 10/2013 | Arumilli et al. |
| 8,576,715 B2 | 11/2013 | Bloch et al. |
| 8,589,587 B1 | 11/2013 | Michailidis et al. |
| 8,599,868 B2 | 12/2013 | Sindhu et al. |
| 8,630,294 B1 | 1/2014 | Keen et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,705,349 B2 | 4/2014 | Bloch et al. |
| 8,730,982 B2 | 5/2014 | Wu et al. |
| 8,738,860 B1 | 5/2014 | Griffin et al. |
| 8,762,595 B1 | 6/2014 | Muller et al. |
| 8,767,561 B2 | 7/2014 | Gnanasekaran et al. |
| 8,811,183 B1 | 8/2014 | Anand et al. |
| 8,838,882 B1 | 9/2014 | Quong |
| 8,879,396 B2 | 11/2014 | Guay et al. |
| 8,923,337 B2 | 12/2014 | Singh |
| 8,989,017 B2 | 2/2015 | Naouri et al. |
| 8,995,265 B2 | 3/2015 | Basso et al. |
| 9,013,999 B1 * | 4/2015 | Kondapalli ........... H04L 47/215 370/412 |
| 9,014,006 B2 | 4/2015 | Haramaty et al. |
| 9,130,885 B1 | 9/2015 | Bukspan et al. |
| 9,210,095 B2 | 12/2015 | Basso et al. |
| 9,325,619 B2 | 4/2016 | Guay et al. |
| 9,325,641 B2 | 4/2016 | Haramaty et al. |
| 9,356,868 B2 | 5/2016 | Tabatabaee et al. |
| 9,385,962 B2 | 7/2016 | Rimmer et al. |
| 9,426,085 B1 | 8/2016 | Anand et al. |
| 9,497,125 B2 | 11/2016 | Raindel et al. |
| 9,563,361 B1 | 2/2017 | Asiot et al. |
| 9,584,429 B2 | 2/2017 | Haramaty et al. |
| 9,648,148 B2 | 5/2017 | Rimmer et al. |
| 9,699,095 B2 | 7/2017 | Elias et al. |
| 9,742,683 B1 | 8/2017 | Vanini |
| 9,742,702 B1 | 8/2017 | Bukspan et al. |
| 9,762,491 B2 | 9/2017 | Gafni et al. |
| 9,807,024 B2 | 10/2017 | Shpiner et al. |
| 10,050,896 B2 * | 8/2018 | Yang ................. H04L 47/30 |
| 10,069,701 B2 | 9/2018 | Elias et al. |
| 10,069,748 B2 | 9/2018 | Shpiner et al. |
| 10,084,716 B2 | 9/2018 | Gafni |
| 10,205,683 B2 | 2/2019 | Elias et al. |
| 10,237,376 B2 | 3/2019 | Crupnicoff et al. |
| 10,250,530 B2 | 4/2019 | Aibester et al. |
| 10,387,074 B2 | 8/2019 | Kriss et al. |
| 10,530,846 B2 | 1/2020 | Jung |
| 10,728,156 B2 * | 7/2020 | Kwan ................. H04L 49/505 |
| 10,778,568 B2 | 9/2020 | Levy et al. |
| 10,951,549 B2 | 3/2021 | Elias et al. |
| 10,999,221 B2 | 5/2021 | Gafni et al. |
| 11,099,891 B2 | 8/2021 | Baldocchi et al. |
| 11,218,413 B2 | 1/2022 | Shpigelman et al. |
| 11,296,988 B2 | 4/2022 | Shpigelman et al. |
| 11,470,010 B2 | 10/2022 | Mula et al. |
| 11,563,695 B2 | 1/2023 | Mitulal et al. |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0039350 A1 | 4/2002 | Wang et al. |
| 2002/0055993 A1 | 5/2002 | Shah et al. |
| 2002/0067695 A1 | 6/2002 | Skarpness et al. |
| 2002/0087723 A1 | 7/2002 | Williams et al. |
| 2002/0176430 A1 | 11/2002 | Sangha et al. |
| 2002/0176432 A1 | 11/2002 | Courtney et al. |
| 2002/0191559 A1 | 12/2002 | Chen et al. |
| 2003/0016628 A1 | 1/2003 | Kadambi et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0065812 A1 | 4/2003 | Beier et al. |
| 2003/0076849 A1 | 4/2003 | Morgan et al. |
| 2003/0095560 A1 | 5/2003 | Arita et al. |
| 2003/0108010 A1 | 6/2003 | Kim et al. |
| 2003/0112817 A1 | 6/2003 | Woo et al. |

(56) References Cited

U.S. PATENT DOCUMENTS

| | | |
|---|---|---|
| 2003/0117958 A1 | 6/2003 | Nation et al. |
| 2003/0118016 A1 | 6/2003 | Kalkunte et al. |
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0179765 A1 | 9/2003 | Goetzinger et al. |
| 2003/0198231 A1 | 10/2003 | Kalkunte et al. |
| 2003/0198241 A1 | 10/2003 | Putcha et al. |
| 2003/0200330 A1 | 10/2003 | Oelke et al. |
| 2003/0217184 A1 | 11/2003 | Nair |
| 2003/0222860 A1 | 12/2003 | Yamaura |
| 2003/0223368 A1 | 12/2003 | Allen, Jr. et al. |
| 2003/0223435 A1 | 12/2003 | Gil |
| 2004/0008714 A1 | 1/2004 | Jones |
| 2004/0027989 A1 | 2/2004 | Martin et al. |
| 2004/0037558 A1 | 2/2004 | Beshasi |
| 2004/0066785 A1 | 4/2004 | He et al. |
| 2004/0081090 A1* | 4/2004 | Hara ................. H04L 47/29 370/229 |
| 2004/0202169 A1 | 10/2004 | Mukouyama et al. |
| 2005/0053077 A1 | 3/2005 | Blanc et al. |
| 2005/0063370 A1 | 3/2005 | Beshai et al. |
| 2005/0076138 A1 | 4/2005 | Sterne |
| 2005/0094643 A1 | 5/2005 | Wang et al. |
| 2005/0125424 A1 | 6/2005 | Herriott et al. |
| 2005/0129033 A1 | 6/2005 | Gordy et al. |
| 2005/0135356 A1 | 6/2005 | Muthukrishnan et al. |
| 2005/0169172 A1 | 8/2005 | Wang et al. |
| 2005/0204103 A1 | 9/2005 | Dennison |
| 2005/0216822 A1 | 9/2005 | Kyusojin et al. |
| 2005/0223139 A1 | 10/2005 | Wagh et al. |
| 2005/0226156 A1 | 10/2005 | Keating et al. |
| 2005/0228900 A1 | 10/2005 | Stuart et al. |
| 2005/0259574 A1 | 11/2005 | Figueira et al. |
| 2006/0008803 A1 | 1/2006 | Brunner et al. |
| 2006/0034172 A1 | 2/2006 | Morton |
| 2006/0087989 A1 | 4/2006 | Gai et al. |
| 2006/0088036 A1 | 4/2006 | De Prezzo |
| 2006/0092837 A1* | 5/2006 | Kwan ................. H04L 47/266 370/468 |
| 2006/0092842 A1 | 5/2006 | Beukema et al. |
| 2006/0092845 A1 | 5/2006 | Kwan et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2006/0251109 A1 | 11/2006 | Muller et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0041385 A1 | 2/2007 | Sali et al. |
| 2007/0053350 A1 | 3/2007 | Spink et al. |
| 2007/0097257 A1 | 5/2007 | El-Maleh et al. |
| 2007/0104102 A1 | 5/2007 | Opsasnick |
| 2007/0104211 A1 | 5/2007 | Opsasnick |
| 2007/0147292 A1 | 6/2007 | Van Ewijk et al. |
| 2007/0201499 A1 | 8/2007 | Kapoor et al. |
| 2007/0274215 A1 | 11/2007 | Gusat et al. |
| 2007/0291644 A1 | 12/2007 | Roberts et al. |
| 2007/0297453 A1 | 12/2007 | Niinomi |
| 2008/0037420 A1 | 2/2008 | Tang et al. |
| 2008/0114893 A1* | 5/2008 | Youn ................. H04L 12/66 709/235 |
| 2008/0144670 A1 | 6/2008 | Gooossens et al. |
| 2008/0175146 A1 | 7/2008 | Van Leekwuck et al. |
| 2008/0192764 A1 | 8/2008 | Arefi et al. |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0073881 A1* | 3/2009 | Cui ................. H04L 47/30 370/235 |
| 2009/0122702 A1 | 5/2009 | Chew et al. |
| 2009/0161684 A1 | 6/2009 | Voruganti et al. |
| 2009/0178140 A1 | 7/2009 | Cao et al. |
| 2009/0182944 A1 | 7/2009 | Comparan et al. |
| 2009/0207848 A1 | 8/2009 | Kwan et al. |
| 2010/0057953 A1 | 3/2010 | Kim et al. |
| 2010/0061238 A1* | 3/2010 | Godbole ................. H04L 47/263 370/235 |
| 2010/0061390 A1 | 3/2010 | Godbole et al. |
| 2010/0067539 A1 | 3/2010 | Lin et al. |
| 2010/0088756 A1 | 4/2010 | Balakrishnan et al. |
| 2010/0100670 A1 | 4/2010 | Jeddeloh |
| 2010/0165842 A1 | 7/2010 | Wang et al. |
| 2010/0220742 A1 | 9/2010 | Brewer et al. |
| 2010/0322076 A1 | 12/2010 | Goel |
| 2010/0325318 A1 | 12/2010 | Desoli et al. |
| 2011/0058571 A1 | 3/2011 | Bloch et al. |
| 2011/0286468 A1 | 11/2011 | Tomonaga et al. |
| 2012/0072635 A1 | 3/2012 | Yoshida et al. |
| 2012/0106562 A1 | 5/2012 | Laor et al. |
| 2012/0106567 A1 | 5/2012 | Hanes et al. |
| 2012/0144064 A1 | 6/2012 | Parker et al. |
| 2012/0155256 A1* | 6/2012 | Pope ................. H04L 47/6275 370/412 |
| 2012/0155264 A1 | 6/2012 | Sharma et al. |
| 2012/0163396 A1* | 6/2012 | Cheng ................. H04L 49/9047 370/412 |
| 2013/0014118 A1 | 1/2013 | Jones |
| 2013/0021354 A1 | 1/2013 | Van Eerd et al. |
| 2013/0039178 A1 | 2/2013 | Chen et al. |
| 2013/0077489 A1* | 3/2013 | Bloch ................. H04L 47/26 370/235 |
| 2013/0212296 A1 | 8/2013 | Goel et al. |
| 2013/0239119 A1 | 9/2013 | Garg et al. |
| 2013/0250757 A1 | 9/2013 | Tabatabaee et al. |
| 2013/0250762 A1 | 9/2013 | Assarpour |
| 2013/0275631 A1 | 10/2013 | Magro et al. |
| 2013/0286834 A1 | 10/2013 | Lee |
| 2013/0305250 A1 | 11/2013 | Durant |
| 2014/0036680 A1* | 2/2014 | Lih ................. H04L 47/6215 370/235 |
| 2014/0036930 A1 | 2/2014 | Lih et al. |
| 2014/0095745 A1 | 4/2014 | Kawahara |
| 2014/0133314 A1 | 5/2014 | Mathews et al. |
| 2014/0140206 A1 | 5/2014 | Hendel et al. |
| 2014/0155043 A1 | 6/2014 | Gell et al. |
| 2014/0192646 A1 | 7/2014 | Mir et al. |
| 2014/0204742 A1 | 7/2014 | Pandit |
| 2014/0269274 A1 | 9/2014 | Banavalikar et al. |
| 2014/0269324 A1 | 9/2014 | Tietz et al. |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0026361 A1 | 1/2015 | Matthews et al. |
| 2015/0058857 A1 | 2/2015 | Sandstorm |
| 2015/0095568 A1 | 4/2015 | Lamb et al. |
| 2015/0103667 A1 | 4/2015 | Elias |
| 2015/0124611 A1 | 5/2015 | Attar et al. |
| 2015/0127797 A1 | 5/2015 | Attar et al. |
| 2015/0163146 A1 | 6/2015 | Zhang et al. |
| 2015/0180782 A1 | 6/2015 | Rimmer et al. |
| 2015/0180790 A1 | 6/2015 | Rimmer et al. |
| 2015/0200866 A1 | 7/2015 | Pope et al. |
| 2015/0371607 A1 | 12/2015 | Holland et al. |
| 2015/0381505 A1 | 12/2015 | Sundararaman et al. |
| 2016/0135076 A1 | 5/2016 | Grinshpun et al. |
| 2016/0173383 A1 | 6/2016 | Liu et al. |
| 2016/0191392 A1 | 6/2016 | Liu |
| 2016/0226951 A1 | 8/2016 | Talpey et al. |
| 2016/0294715 A1 | 10/2016 | Raindel et al. |
| 2016/0337257 A1 | 11/2016 | Yifrach et al. |
| 2017/0118108 A1 | 4/2017 | Avci et al. |
| 2017/0142020 A1 | 5/2017 | Sundararaman et al. |
| 2017/0180261 A1 | 6/2017 | Ma et al. |
| 2017/0187641 A1 | 6/2017 | Lundqvist et al. |
| 2017/0295112 A1 | 10/2017 | Cheng et al. |
| 2017/0373989 A1 | 12/2017 | Gafni et al. |
| 2018/0063030 A1 | 3/2018 | Mitutal et al. |
| 2018/0063038 A1 | 3/2018 | Ghanwani et al. |
| 2018/0091388 A1 | 3/2018 | Levy et al. |
| 2018/0115498 A1 | 4/2018 | Sundaram et al. |
| 2018/0205653 A1 | 7/2018 | Wang et al. |

(56) References Cited

U.S. PATENT DOCUMENTS

| | | | |
|---|---|---|---|
| 2018/0241677 A1 | 8/2018 | Srebro et al. | |
| 2018/0278550 A1 | 9/2018 | Rosen et al. | |
| 2018/0302328 A1* | 10/2018 | Keith | H04L 43/16 |
| 2019/0042443 A1 | 2/2019 | Maciejewski et al. | |
| 2019/0042513 A1 | 2/2019 | Fleming, Jr. et al. | |
| 2019/0044874 A1 | 2/2019 | Zhang et al. | |
| 2020/0177521 A1 | 6/2020 | Blumrich et al. | |
| 2020/0280518 A1 | 9/2020 | Lee et al. | |
| 2021/0006502 A1 | 1/2021 | Zhou et al. | |
| 2021/0344600 A1 | 11/2021 | Urman et al. | |
| 2021/0377074 A1 | 12/2021 | Yoshida et al. | |
| 2022/0045972 A1 | 2/2022 | Aibester et al. | |
| 2022/0231933 A1 | 7/2022 | Mannor et al. | |
| 2022/0263776 A1 | 8/2022 | Mula et al. | |
| 2023/0068902 A1 | 3/2023 | Seely et al. | |
| 2023/0137826 A1 | 5/2023 | Ajami et al. | |

FOREIGN PATENT DOCUMENTS

| | | |
|---|---|---|
| EP | 1698976 A1 | 9/2006 |
| EP | 1720295 A1 | 11/2006 |
| EP | 2466476 A1 | 6/2012 |
| WO | 03024033 A1 | 3/2003 |
| WO | 2009107089 A2 | 9/2009 |
| WO | 2013136355 A1 | 9/2013 |
| WO | 2013180691 A1 | 12/2013 |
| WO | 2018044426 A1 | 3/2018 |
| WO | 2018106868 A1 | 6/2018 |
| WO | 2019029318 A1 | 2/2019 |

OTHER PUBLICATIONS

U.S. Appl. No. 17/503,383 Office Action dated Jun. 8, 2023.
U.S. Appl. No. 17/503,383 Office Action dated Aug. 17, 2023.
Gran et al., "Congestion Management in Lossless Interconnection Networks", Submitted to the Faculty of Mathematics and Natural Sciences at the University of Oslo in partial fulfillment of the requirements for the degree Philosophiae Doctor, pp. 1-156, Sep. 2013.
Pfister et al., "Hot Spot Contention and Combining in Multistage Interconnect Networks", IEEE Transactions on Computers, vol. C-34, pp. 943-948, Oct. 1985.
Zhu et al., "Congestion control for large-scale RDMA deployments", SIGCOMM, ACM, pp. 523-536, Aug. 17-21, 2015.
CISCO Systems, Inc., "Advantage Series White Paper Smart Buffering", pp. 1-16, year 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06, pp. 1-23, Mar. 18, 2016.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, issue 2, pp. 130-140, Apr. 1998.
Ramakrishnan et al., "The Addition of Explicit Congestion Notification (ECN) to IP", Request for Comments 3168, Network Working Group, pp. 1-63, Sep. 2001.
IEEE Standard 802.1Q™-2005, "IEEE Standard for Local and metropolitan area networks Virtual Bridged Local Area Networks", pp. 1-303, May 19, 2006.
Infiniband ™ Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks- Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", pp. 1-40, Sep. 30, 2011.
Cisco Systems, Inc., "Priority Flow Control: Build Reliable Layer 2 Infrastructure", pp. 1-8 pages, year 2015.
Huawei Technologies Co., Ltd., Baidu, Inc., "The Lossless Network for Data Centers," Revision 1.0, pp. 1-15, Nov. 7, 2017.
Infiniband Architecture Release 1.2.1, vol. 1, General specifications, Chapter 7.9, pp. 212-216, Nov. 2007.
Raatikainen, P., "ATM Switches—Switching Technology S38.3165", Switching Technology, L8-1, pp. 1-34, year 2006 (http://www.netlab.hut.fi/opetus/s383165).
Fahmy, S., "A Survey of ATM Switching Techniques", Department of Computer and Information Science, The Ohio State University, USA, pp. 1-22, Aug. 21, 1995 downloaded from http://www.cs.purdue.edu/homes/fahmy/cis788.08Q/atmswitch.html.
Minkenberg et al., "Multistage Interconnection Networks for Data Centers; Bidirectional Fat Tree Construction and Routing for IEEE 802.1au", IBM Research GmbH, Zurich, Switzerland, pp. 1-9, Jul. 2, 2007.
Bwalya et al., "Performance Evaluation of Buffer Size for Access Networks in First Generation Optical Networks", International Journal of Internet of Things, vol. 6, issue 3, pp. 98-105, year 2017.
"Understanding CoS Priority Group and Queue Guaranteed Minimum Bandwidth," Traffic Management User Guide (QFX Series and EX4600 Switches), juniper.net, pp. 1-4, Feb. 1, 2021, as downloaded from https://www.juniper.net/documentation/US/en/software/junos/traffic-mgmt-qfx/topics/concept/cos-qfx-series-guaranteed-bandwidth-understanding.html.
"QoS Modular Qos Command—Line Interface Configuration Guide, Cisco IOS Xe Fuji 16.8x," Cisco, pp. 1-25, Apr. 20, 2018, as downloaded from https://www.cisco.com/c/en/US/td/docs/ios-XML/ios/qos_mqc/configuration/xe-16-8/qos-mqc-xe-16-8-book/qos-limits-wred.html.
Aibester et al., U.S. Appl. No. 17/503,383, filed Oct. 18, 2021.
Aibester et al., U.S. Appl. No. 17/516,731, filed Nov. 2, 2021.
CN Application # 2021108967450 Office Action dated Sep. 8, 2023.
U.S. Appl. No. 17/588,385 Office Action dated Oct. 5, 2023.
U.S. Appl. No. 17/516,731 Office Action dated Oct. 6, 2023.
Ramakrishnan et al., "The Addition of Explicit Congestion Notification (ECN) to IP," Request for Comments (RFC) 3168, The Internet Society, pp. 1-63, Sep. 2001.
Spitulski, U.S. Appl. No. 17/840,371, filed Jun. 14, 2022.
Kadosh et al., U.S. Appl. No. 17/348,801, filed Jun. 16, 2021.
Aibester et al., Appl. No. 17/588,385, filed Jan. 31, 2022.
Aibester et al., U.S. Appl. No. 17/895,108 filed Aug. 25, 2022.
U.S. Appl. No. 17/503,383 Office Action dated Nov. 4, 2022.
Aibester et al., U.S. Appl. No. 17/955,591, filed Sep. 29, 2022.
U.S. Appl. No. 17/895,108 Office Action dated Oct. 29, 2024.

* cited by examiner

HEAD-OF-QUEUE BLOCKING FOR MULTIPLE LOSSLESS QUEUES

CROSS-REFERENCE TO RELATED APPLICATIONS

This application is a continuation of U.S. patent application Ser. No. 16/783,184, filed Feb. 6, 2020, which is incorporated herein by reference.

BACKGROUND OF THE INVENTION

Communication systems, and, particularly, data center networks, must handle large volume of data traffic with a low rate of lost datagrams. The Institute of Electrical and Electronics Engineers (IEEE) 802 Nendica report titled "The Lossless Network for Data Centers," 2018 summarizes trends and issues in lossless data center networks, discusses the need for new technologies to combat loss and introduces potential solutions. A shorter version can be found in: "The Lossless Network for Data Centers," Huawei Technologies Co., Ltd., Baidu, Inc., Revision 1.0, Nov. 1, 2017.

SUMMARY OF THE INVENTION

An embodiment of the present invention that is described herein provides a network element including at least one headroom buffer, and flow-control circuitry. The headroom buffer is configured for receiving and storing packets from a peer network element having at least two data sources, each headroom buffer serving multiple packets. The flow-control circuitry is configured to quantify a congestion severity measure, and, in response to detecting a congestion in the headroom buffer, to send to the peer network element pause-request signaling that instructs the peer network element to stop transmitting packets that (i) are associated with the congested headroom buffer and (ii) have priorities that are selected based on the congestion severity measure.

In some embodiments, the headroom buffer is configured to receive packets from at least two queues in the peer network element, at least one of the queues having at least two data sources, to store packets from the queues in different locations, and to quantify congestion severity measures separately for each of the queues. In an example embodiment, the headroom buffer includes a plurality of buffers, each buffer configured to store packets from a corresponding queue in the peer network element.

There is additionally provided, in accordance with an embodiment of the present invention, a network element including at least one transmit-queue, and flow-control circuitry. The transmit-queue is configured for transmitting packets from at least two sources, each source having a predefined priority level, to a headroom buffer of a peer network element. The flow-control circuitry is configured to receive from the peer network element pause-request signaling that specifies a congestion severity measure, and, responsive to the pause-request signaling, select a threshold priority based on the congestion severity measure, and stop transmitting packets that (i) are associated with the data sources of the queue and (ii) have priorities that are lower than the threshold priority.

In an embodiment, the network element includes at least two transmit queues, at least one of the transmit queues having at least two sources.

There is also provided, in accordance with an embodiment of the present invention, a network element including at least one transmit-queue, and flow-control circuitry. The transmit-queue is configured for transmitting packets from at least two sources, each source having a predefined priority level, to a headroom buffer in a peer network element. The flow-control circuitry is configured to receive from the peer network element signaling that indicates a number of credits for transmitting packets to the peer network element, and, responsive to the signaling, select a threshold priority based on the number of credits indicated in the signaling, transmit packets associated with data sources of the queue that are higher in priority than the threshold priority, and refrain from transmitting other packets associated with the queue.

In an embodiment, the network element includes at least two transmit queues, at least one of the transmit queues having at least two sources.

There is further provided, in accordance with an embodiment of the present invention, a method for communication, including, in a network element, receiving and storing in at least one headroom buffer packets from a peer network element having at least two data sources, each headroom buffer serving multiple packets. A congestion severity measure is quantified. In response to detecting a congestion in the headroom buffer, pause-request signaling is sent to the peer network element. The pause-request signaling instructs the peer network element to stop transmitting packets that (i) are associated with the congested headroom buffer and (ii) have priorities that are selected based on the congestion severity measure.

In some embodiments, receiving the packets includes receiving in the headroom buffer packets from at least two queues in the peer network element, at least one of the queues having at least two data sources, storing the packets includes storing the packets from the queues in different locations, and quantifying the congestion severity measure includes quantifying congestion severity measures separately for each of the queues. In an embodiment, the headroom buffer includes a plurality of buffers, and storing the packets includes storing in each buffer packets from a corresponding queue in the peer network element.

There is additionally provided, in accordance with an embodiment of the present invention, a method for communication, including, using at least one transmit-queue in a network element, transmitting packets from at least two sources, each source having a predefined priority level, to a headroom buffer of a peer network element. Pause-request signaling, which specifies a congestion severity measure, is received from the peer network element. Responsive to the pause-request signaling, a threshold priority is selected based on the congestion severity measure, and transmission of packets that (i) are associated with the data sources of the queue and (ii) have priorities that are lower than the threshold priority, is stopped.

There is also provided, in accordance with an embodiment of the present invention, a method for communication, including, using at least one transmit-queue in a network element, transmitting packets from at least two sources to a headroom buffer in a peer network element, each source having a predefined priority level. Signaling, which indicates a number of credits for transmitting packets to the peer network element, is received from the peer network element. Responsive to the signaling, a threshold priority is selected based on the number of credits indicated in the signaling, packets associated with data sources of the queue that are higher in priority than the threshold priority are transmitted, and other packets associated with the queue are refrained from transmission.

The present invention will be more fully understood from the following detailed description of the embodiments thereof, taken together with the drawings in which:

DETAILED DESCRIPTION OF EMBODIMENTS

Overview

Figure 1:
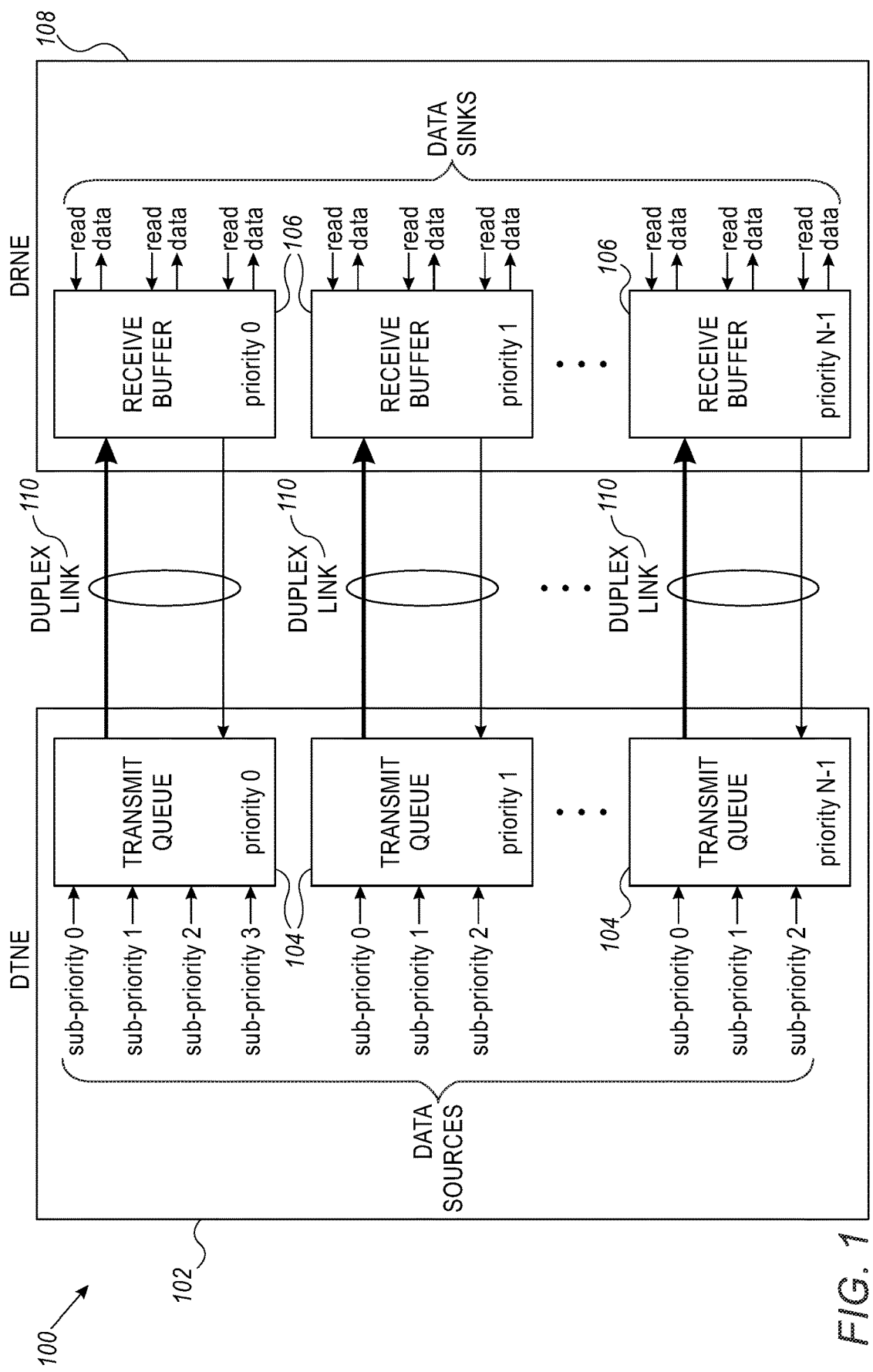
FIG. 1 is a block diagram that schematically illustrates lossless data transfer between two network elements, in accordance with an embodiment of the present invention.

Modern data centers typically handle massive amounts of data that are generated and forwarded by highly parallel applications, such as Artificial Intelligence (AI) applications, which historically required specialized High-Performance Computing (HPC) infrastructure. Using high-speed distributed solid-state storage, coupled with remote direct memory access (RDMA) and modern networking congestion management techniques, the applications may run atop more generalized next generation cloud infrastructure.

According to the IEEE 802 Nendica Report cited above, "the key to advancing cloud infrastructure to the next level is the elimination of loss in the network, not just packet loss, but throughput loss and latency loss." Lossless traffic is the egress-port ability to send a packet across media, knowing that the packet will have buffer space in the receiving ingress-port.

As the sorting and forwarding of ingress packets at the ingress port may take some time (e.g., when the destination of the packet is not ready to receive the packet), the ingress port assigns a buffer (referred to as Headroom Buffer hereinbelow) to store packets that are received from the remote egress-port. The buffer is emptied when data packets that are stored in the buffer are forwarded to destinations (or pulled by the destinations) and filled when new packets are received from the peer egress port. If the rate at which data packets are forwarded to destinations (buffer emptying rate) is lower than the rate at which new data packets are written into the buffer (buffer fill-rate), the buffer may fill up, and new packets may be lost. This phenomenon is sometimes called "queue overflow data-loss".

To reduce the risk of queue overflow data loss, a duplex connection with a suitable flow-control scheme may be established between the egress port and the ingress port. When the headroom buffer is congested (e.g., the free size in the buffer is smaller than a preset threshold), the ingress port sends congestion notification packets to the egress port, responsive to which the egress port lowers the rate of data packet transmissions.

Two flow-control methods using congestion-notifications packets are commonly used—Credits-Based and Pause-Based. According to the credit-based method, the receiver, upon initialization, grants the transmitter data-sending credits corresponding to the available space in the headroom buffer, for example, in units of 128 bytes. The sender uses the credits to send data, and the receiver sends new credits when old data packets are read from the headroom buffer.

In contrast, according to the pause-based method, the receiver sends a Pause request (which may be embedded in other flow-control packets, or sent as a separate packet) when the headroom buffer is congested, and the transmitter, when receiving a pause request, stops sending packets for a period of time which may be predefined, changing dynamically or, for example, indicated in the pause request (the transmitter may also resume sending packets when receiving a "resume" request from the receiver).

The single buffer solution described above does not work well when flows of packets sent from the egress port to the ingress port with several varying priority service classes are supported. If a packet associated with a low priority service is stuck, e.g., when the destination is not free to receive the packet, all subsequent packets, including packets with higher service class, will have to wait. This phenomenon is sometimes called Head-Of-Queue Blocking.

To mitigate head-of-queue blocking, the headroom buffer may be partitioned into two or more separate smaller buffers, which are sometimes called, in Infiniband™ nomenclature, Virtual Lanes (VL) and, in Ethernet nomenclature, IEEE-priority. The partition into separate buffers allows independent packet communication in a plurality of parallel channels from a transmitter to a receiver and mitigates head-of-queue blocking. Moreover, the partition allows prioritizing according to service classes, wherein a higher priority service class may be assigned a larger buffer, as well as higher communication and processing priority.

However, in both the VL and the IEEE priority schemes, the number of concurrent streams is limited to eight; and, as the number of priority levels may be substantially more than eight, a plurality of packets of varying priorities needs to share the same VL or IEEE priority level.

Embodiments according to the present invention that are described herein provide systems and methods for improved lossless communication when a plurality of flows with varying priorities share the same VL or IEEE priority (and, hence, much more than eight priority levels may be supported with the eight-priority VL or IEEE-priority schemes). (To avoid confusion with the inter-queue priorities, we will refer to the priorities within each queue as sub-priorities.)

In the description hereinbelow, we will refer to the network element that sends data packets as Data Transmitting Network Element (DTNE), and to the network element that receives data packets as Data Receiving Network Element (DRNE). As would be appreciated, a network element may function as a DTNE in some ports and as a DRNE in other ports. Additionally or alternatively, ports of the network element that send data packets, may be reconfigured to ports that receive data packets, and vice-versa.

According to an embodiment, a DTNE is configured to receive credits from a DRNE. The DRNE comprises a headroom buffer which is divided into eight (or less) separate buffers, associated with respective peer queues in a peer DTNE. The DRNE sends credit allocation packets to the DTNE responsive to removal of the data from the buffers, expecting the peer DTNE to send packets only if the DTNE has enough credits (separately for each queue).

The DTNE is configured to send data separately to each of the separate buffers of the headroom buffer of the DRNE, and to receive credit allocation packets from the DRNE. The DTNE may comprise a plurality of data sources with varying sub-priorities for each of the DRNE buffers (in some embodiments, the DTNE further comprises transmit queues, which temporarily store the packets). The DTNE is further configured to send, for each of the buffers, data from sources with a sub-priority greater than a threshold, wherein a Flow Control Circuitry within the DTNE sets the threshold, responsive to the number of available credits for the queue.

Thus, in a credit-based system according to embodiments of the present invention, a DTNE can control the sub-priority of the sources for each of the DTNE buffers, and, whereas a stalled high sub-priority source can still block transfer of data packets, a low sub-priority source cannot block sources with higher sub-priorities.

According to another embodiment of the present invention, a DRNE comprises a Flow Control Circuitry, which calculates a congestion-severity measure for each of the buffers in the headroom buffer (the congestion-severity measure may be, for example, the occupancy of the buffer). Responsive to the congestion-severity measure, the DRNE may send pause request packets with sub-priority indication to a peer DTNE. The peer DTRE comprises a plurality of data sources with varying sub-priorities, and is configured to receive the pause request packets from the DRNE, and to pause sending packets from sources having sub-priorities lower than the sub-priority indicated in the pause-request packets. Thus, low-severity congestions in a DRNE queue will pause low-sub-priority sources only, and high priority sources will pause only when the congestion is severe.

System Description

FIG. 1 is a block diagram 100 that schematically describes lossless data transfer between two network elements, in accordance with an embodiment of the present invention.

A Data-Transmitting Network Element (DTNE) 102 comprises N Transmit Queues 104, which are coupled to N Receive Buffers 106 in a Data Receiving Network Element (DRNE) 108, through N duplex links 110 (Although DTNE 102 and DRNE 108 are network elements in the sense that they are configured to send and receive packets from the network, lossless data transfer is often associated with data centers and the connection between DTNE 102 and DRNE 108 typically comprises direct point to point connections rather than communication through a network).

The data path comprising a transmit queue 104, a duplex link 110 and a receive queue 106 will be referred to herein as Virtual-Lane (VL), and, although VL is commonly used in Infiniband nomenclature, the present invention is not limited to Infiniband and alternative embodiments may use IEEE priorities, or any other suitable link virtualization technique.

As would be appreciated, duplex links 110 are not necessarily separate physical links; rather, in embodiments, duplex links 110 are logical links, which may share the same physical link (or physical links).

Data sources within the DTNE transmit flows of data packets that may have varying service classes and, accordingly, variable priorities. The division of the communication to VLs allows eight levels of priority, and the DTNE assigns the data sources to transmit queues accordingly.

However, in many applications, N (which is typically limited to 8) is not enough, as many more priorities are needed. In the example embodiment illustrated in FIG. 1, a plurality of data sources with varying priorities is input to each Transmit Queue. The priorities of the data sources that are input to each transmit queue 104 will be referred to herein as sub-priorities, which are hierarchically below the priorities of the VLs and the corresponding transmit queues. The combined priority scheme is defined as follows—if A>B, all data sources that are input to a transmit queue A have higher priority than data sources that are input to a transmit queue B. Within the same transmit queue, priority order is according to the sub-priorities of the inputs to the transmit queue.

In embodiments according to the present invention, the DTNE and/or the DRNE comprise flow-control circuitry (not shown), that prioritizes the transmission of packets in each VL according to the sub-priorities that are assigned to the data sources input to the transmit queue.

Thus, according to the example embodiment illustrated in FIG. 1, a limited number of Virtual Lanes may support a higher number of priorities (and, hence, service classes). In each VL, a stalled low-priority data packet cannot block higher priority data packets.

As would be appreciated, the configuration of lossless data network 100, including DTNE 102, DRNE 108 and Duplex Links 110 is an example configuration that is depicted purely for the sake of conceptual clarity. Other suitable configurations may be used in alternative embodiments of the present invention. For example, in some embodiments some of duplex links 110 may share a common physical connection; in other embodiments some or all the control packets that the DRNE sends to the DTNE may be concatenated in a smaller number of packets, or in a single packet. In an embodiment, data is transferred within units of the same system, which may be a High-Performance Computing (HPC) system; in this embodiment data may be transferred through high performance busses.

Credit-Based Method

According to some embodiments of the present invention, a DRNE sends credits to a peer DTNE when the amount of free storage space in the receive buffer is more than a predefined threshold. According to an embodiment, the DTNE is granted with an initial amount of credits when the receive queue is empty (e.g., upon initialization), and stores it in a credits-accumulator. The DTNE decrements the credits-accumulator when sending data and increments the credits-accumulator when receiving new credits from the DRNE. In some embodiments, each credit represents a fixed buffer size; e.g., 128 bytes).

In an embodiment, the DTNE is configured to receive data from a plurality of sources for each of the Transmit Queues, wherein a different sub-priority level is allocated to each data source. The DTNE may transfer data to the DRNE, separately for each Transmit Queue, responsive to the priority of the data sources and the amount of credits in the credits-accumulator.

Figure 2:
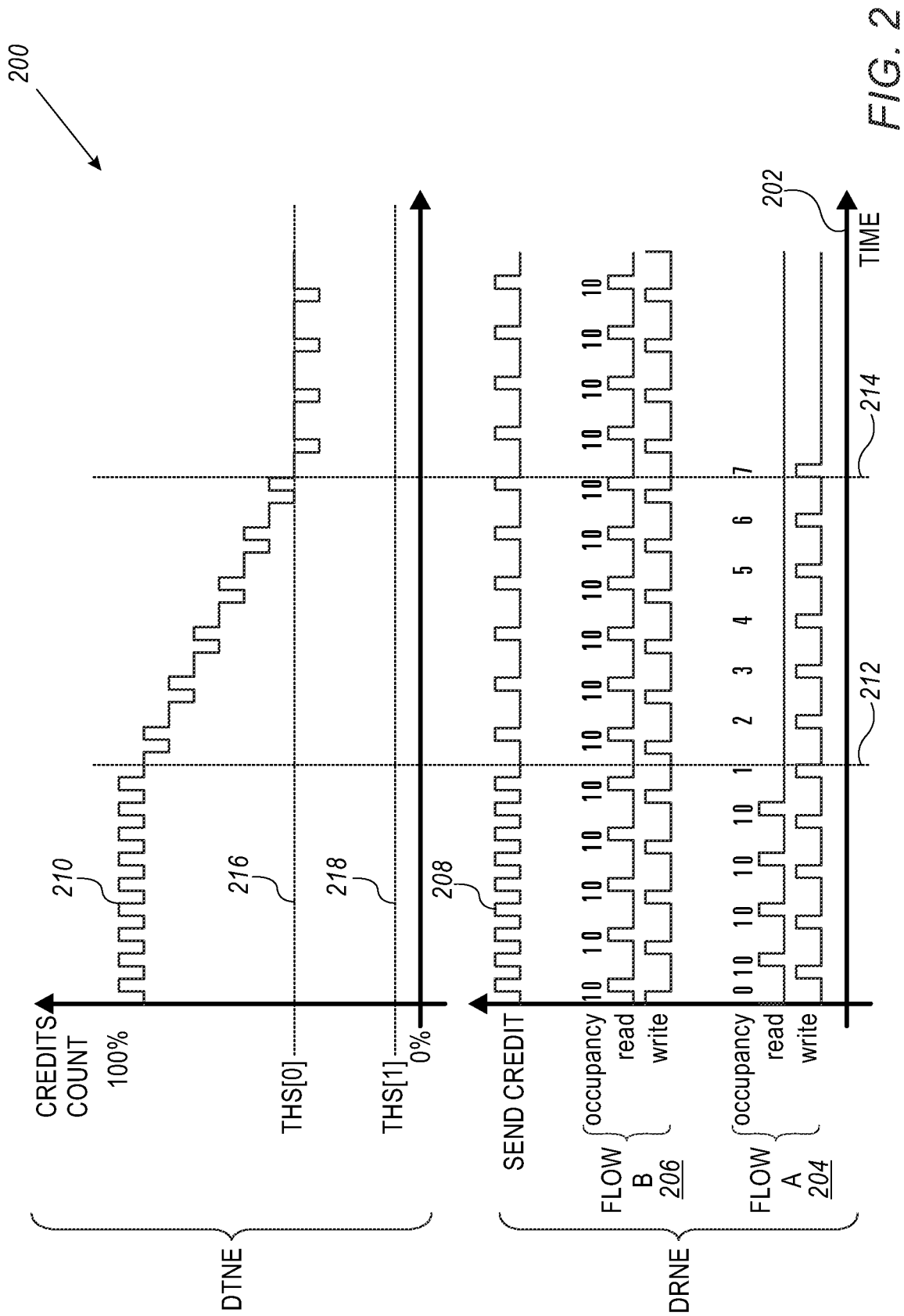
FIG. 2 is a timing diagram that schematically illustrates credits-based data transfer along a horizontal Time axis, in accordance with an embodiment of the present invention.

FIG. 2 is a timing diagram 200 that schematically describes credits-based data transfer along a horizontal Time axis 202, in accordance with an embodiment of the present invention. The top part of the figure illustrates the credits status and thresholds in the DTNE, whereas the bottom part describes activities in the DRNE.

The example embodiment illustrated in FIG. 2 refers to flows that are routed to a single receive buffer 106 (FIG. 1). There are two flows having two sub-priorities in the example embodiment illustrated in FIG. 2—a lower sub-priority Flow A 204, and a higher sub-priority flow B 206. For each of the two flows, write events, read events and partial occupancy of the Receive Buffer, are shown. An event, in this example embodiment, corresponds to the transfer of a block of data equal in size to one credit (e.g., 1 Mbyte), which will be referred to herein as Data Unit.

The timing diagram starts at a steady state, in which the receive buffer is assumed to be almost empty, and whenever the Receive Buffer receives a data packet, the DRNE immediately sends the data from the Receive Buffer to a Flow-A or a Flow-B destination, and, sends a credit to the DTRE. The occupancies of Flow A and Flow B within the Receive Buffer, therefore, oscillate between 1 and 0 units.

A Send-Credit graph 208 illustrates the credits that the DRNE sends to the DTNE, triggered by the sending of data from the Receive Buffer (to a Flow-A or a Flow-B destination), and a Credits graph 210 illustrates the number of credits in the DTNE.

At a time-point 212 the DRNE stops sending Flow-A data from the Receive Buffer. This may happen, for example, if the DRNE hardware cannot find routing rules in its local memory and needs to "ask" the processor to calculate the routing. As no Flow-A data is read from the Receive Buffer, Flow A's occupancy in the Receive Buffer will start to grow. Flow B's occupancy will continue to oscillate between 1 and 0.

The frequency of the Send Credits events will decrease by 50%, and the credits count in the credits accumulator will start to decline, as for every two unit-decrements (one for Flow A and one for Flow B), the DTNE will receive only one credit.

According to the example embodiment illustrated in FIG. 2, the DTNE is configured to compare the number of credits in the credits-accumulator to two thresholds—a Threshold TH[0] 216 and a threshold TH[1] 218. If the number of credits is not higher than TH[0], the DTNE will stop sending the lower priority Flow-A data packets to the Receive Buffer, but will continue to send the higher priority Flow-B data packets. If the number of credits is not higher than TH[1], the DTNE will stop sending all packets.

At a time-point 214 the number of credits in the DTNE reaches TH[0]. The DTNE stops sending Flow A data packets, but continues to send Flow B data packets. The communication is now balanced, and the number of credits remains close to TH[0]. Flow B is still protected from overflow, and, if the credit count will decrease to TH[1], the DTNE will wait for new credits.

Thus, according to the example embodiment illustrated in FIG. 2, head-of-queue blocking in a lower sub-priority does not stop transmissions of data packets from a higher sub-priority.

As would be appreciated, timing diagram 200 is a simplified example that is depicted purely for the sake of conceptual clarity. The illustration and the description ignore the delay in the communication link and assume stable read and write rates. In practical scenarios, the credits count may widely fluctuate. Data is not always read right after it is written, and the read and write quanta may be different in size than a credit. In alternative embodiments, more than two sub-priorities may be used, each with its own threshold (some of the thresholds may be equal).

Figure 3:
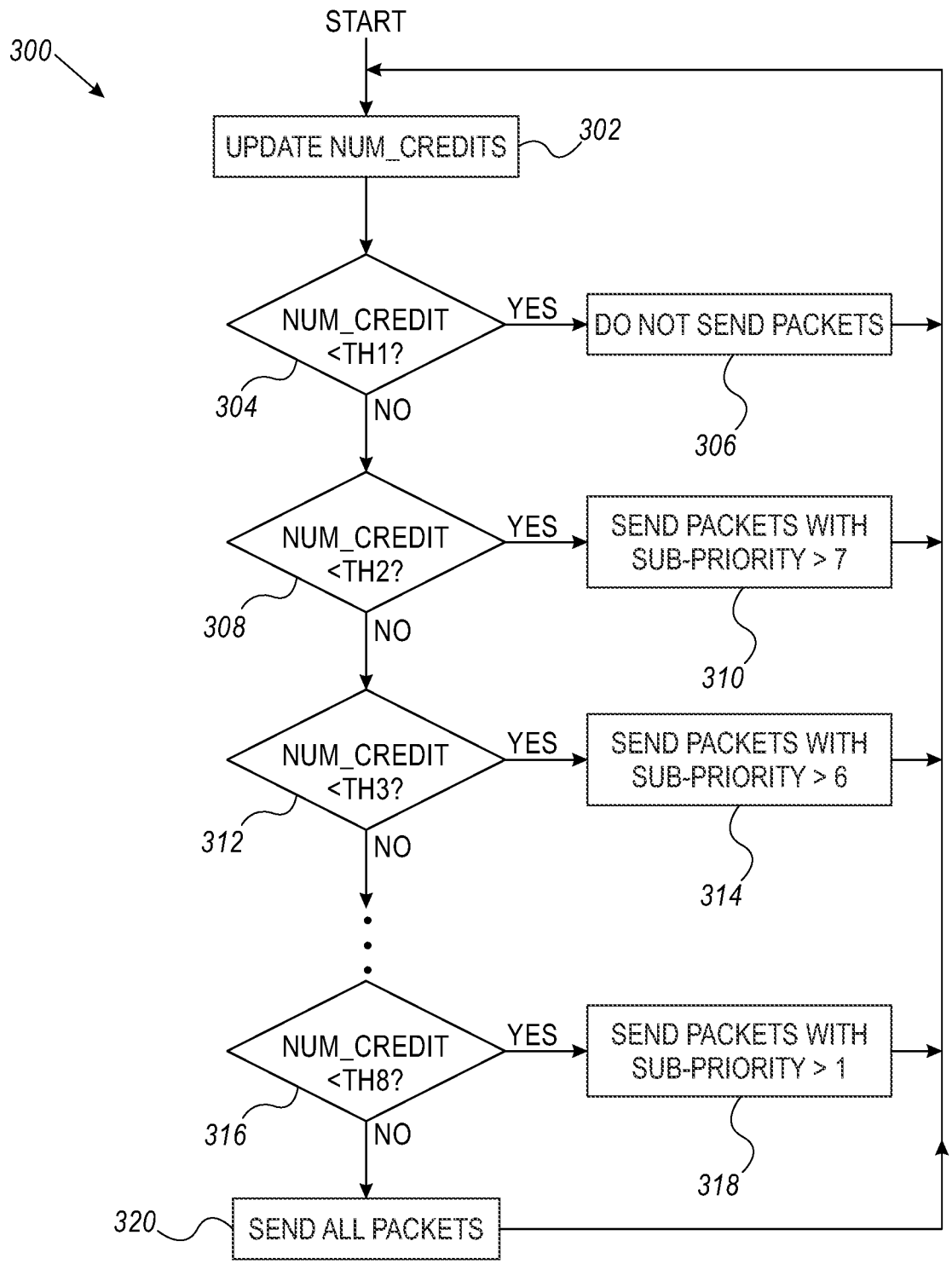
FIG. 3 is a flowchart that schematically illustrates a method for supporting sub-priorities in a credits-based system, in accordance with embodiments of the present invention.

FIG. 3 is a flowchart 300 that schematically illustrates a method for supporting sub-priorities in a credits-based system, in accordance with embodiments of the present invention. The method that is illustrated in FIG. 3 supports eight sub-priorities but can be readily modified to any number of sub-priorities. The flowchart is executed by Transmit-Queue 104 (FIG. 1).

The flowchart starts at an Updating-Number-Of-Credits step 302, wherein the Transmit-Queue either increments the number of credits in response to credits that the Transmit Queue receives from the DRNE, or decrements the number-of-credits, after sending a data packet to the DRNE.

Next, in a Comparing-First-Threshold step 304, the Transmit Queue compares the number of credits to the lowest threshold TH1, associated with the highest sub-priority. If the number of credits is lower than TH1, the Transmit-Queue will, in a Not-Sending-Packets step 306, stop sending any packets, and then re-enter Updating-Number-Of-Credits step 302. If, in step 304, The number of credits is not lower than TH1, the Transmit Queue will enter a Comparing-Second-Threshold step 308 and compare the number of credits to a second (higher) threshold TH2. If the number of credits is lower than TH2 the Transmit Queue will enter a Sending-Sub-Priorities-Greater-than-7 step 310 and send data packets with the highest sub-priority (8) only, and then re-enter Updating-Number-Of-Credits step 302.

If, in step 308, The number of credits is not lower than TH2, the Transmit Queue will enter a Comparing-Third-Threshold step 312 and compare the number of credits to a third threshold TH3. If the number of credits is lower than TH3 the Transmit Queue will enter a Sending-Sub-Priorities-Greater-than-6 step 314 and send data packets with the two highest sub-priorities (7 and 8) only, and then re-enter Updating-Number-Of-Credits step 302.

The method continues in the same manner for higher thresholds and lower sub-priorities, until the Transmit-Queue enters a Comparing-Eighth-Threshold step 316. If the number of credits is lower than this maximal threshold TH8, the Transmit-Queue will enter a Sending Sub-Priorities-Greater-than-1 step 318 and send all but the lowest priority packets, and then re-enter Updating-Number-Of-Credits step 302. If, in step 316, the number of credits is still not below the highest threshold TH8, the Transmit Queue will send all packets, and then re-enter Updating-Number-Of-Credits step 302.

Thus, according to the example embodiment illustrated in FIG. 3, the Transmit Queue compares the number of available credits to a list of thresholds and prioritizes between data packets that the Transmit Queue sends to the DRNE accordingly.

As would be appreciated, flowchart 300 is an example flowchart that is depicted purely for the sake of conceptual clarity. Other suitable flowcharts may be used in alternative embodiments of the present invention. For example, the number of sub-priorities may be different from n and/or some sub-priorities may be assigned the same threshold. In an embodiment, some thresholds are predefined (or programmed) and other thresholds may be calculated from the predefined thresholds, using, for example, interpolation.

Figure 4:
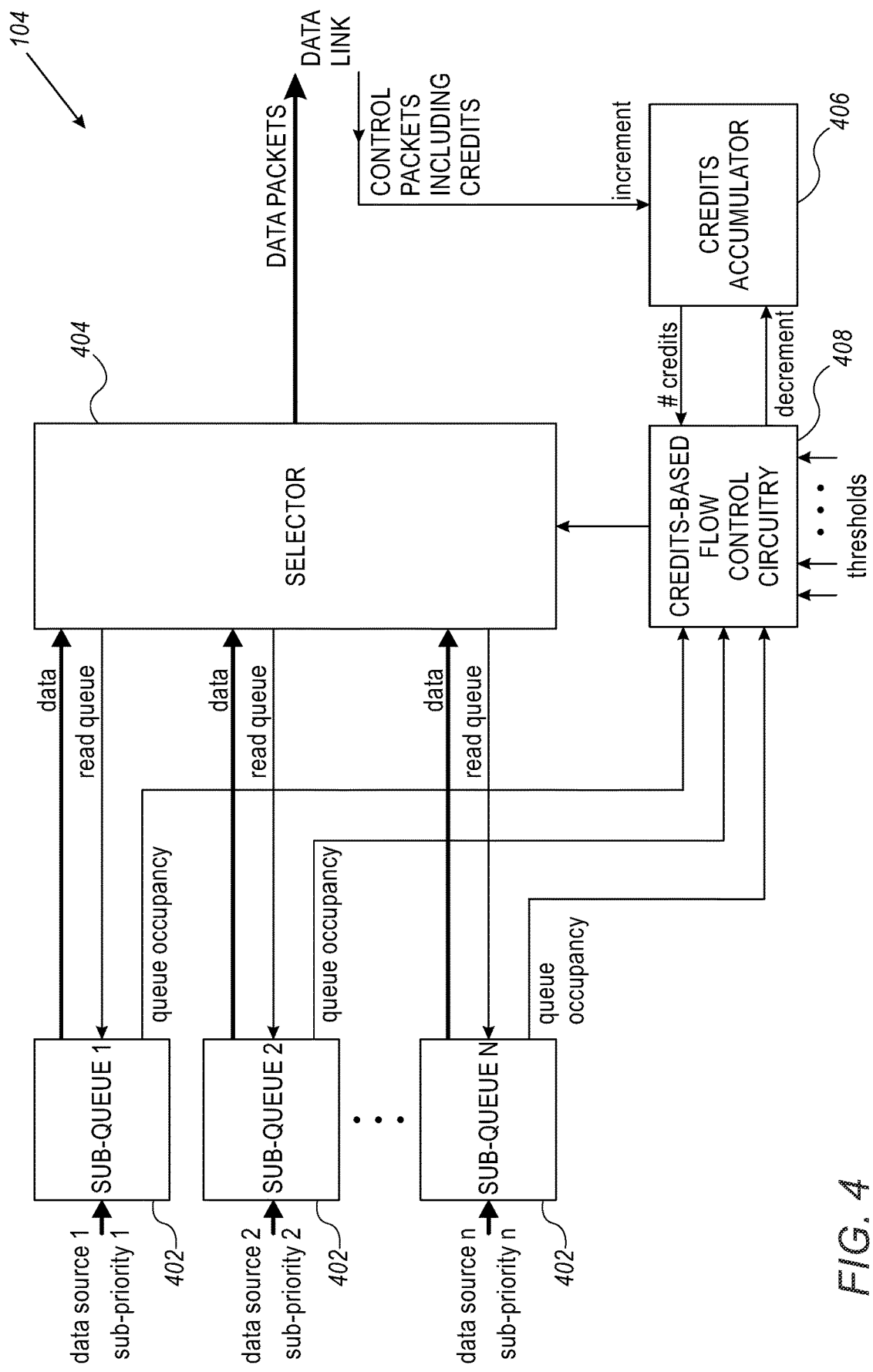
FIG. 4 is a block diagram that schematically illustrates a Transmit-Queue in a credit-based system, in accordance with an embodiment of the present invention.

FIG. 4 is a block diagram that schematically describes a Transmit-Queue 104 (FIG. 1) in a credit-based system, in accordance with an embodiment of the present invention. The Transmit Queue receives data with varying sub-priorities from n sources, and comprises n Sub-Queues 402, a Selector 404, a Credits Accumulator 406 and a Credits-Based Flow-Control Circuit (CBFCC) 408.

The Transmit Queue stores data packets in sub-queues 402, which indicate the respective queue occupancies to the CBFCC. The Transmit Queue receives control packets from the DRNE. The control packets include credits. In some embodiments, the DRNE sends a single control packet to multiple Transmit Queues, and each Transmit Queue extracts the respective credits; in other embodiments, each Transmit Queue receives a separate control packet from the DRNE.

The credits that the Transmit-Queue receives increment Credit Accumulator 406, which indicates the credits count to CBFCC 408. The CBFCC receives threshold for each of the sub-priorities (the thresholds may be fixed, or dynamically adjusted) and, responsive to the thresholds, the occupancies of the queues and the credit count, indicates to selector 404 to read a data packet from one of sub-queues 402, and to send the packet to the DRNE. The CBFCC is further configured to decrement the credit-count in the Credits Accumulator whenever the CBFCC sends a read indication to the selector.

The selection logic that the CBFCC applies may be, for example:

A—pre-select sub-queues for which the threshold is above the credit-count indicated by the credits-accumulator B—from the pre-selected sub-queues, select the sub-queue with the highest occupancy.

C—select none if all the pre-selected sub-queues are empty.

Thus, according to the example embodiment illustrated in FIG. 3, each transmit queue can prioritize multiple data sources, resulting in a credit-based system with more than eight priorities.

As would be appreciated, the configuration of Transmit-Queue 104 is an example configuration that is depicted purely for the sake of conceptual clarity. Other suitable configurations may be used in alternative embodiments of the present invention. For example, data flow order may change, so that a selector will select data packets from one of the sources, and a single Transmit Queue will be used. In some embodiments, the data sources may comprise net data, and the Transmit Queue may incorporate packetizing logic, which adds headers and footers to the data.

The selection logic employed by the CBFCC may vary. For example, from the pre-selected sub-queues, the CBFCC, in some embodiments, will select the sub-queue with the highest priority (if the sub-queue Is not empty). In some embodiments, if all preselected sub-queues are empty, the CBFCC will select a sub-queue with a threshold that is below the credits-count; in some embodiments, the selection logic may change dynamically.

Pause-Based Method

According to some embodiments of the present invention, a DRNE sends Pause requests to the DTNE when the DTRE headroom buffer is occupied beyond a preset limit. To assign sub-priorities, a DRNE in accordance with the present invention compares the occupancy of the headroom buffer to a set of thresholds, and then sends to the DTNE a Pause request with sub-priority indication. The DTNE can then stop sources according to the sub-priority indicated in the pause request.

Figure 5:
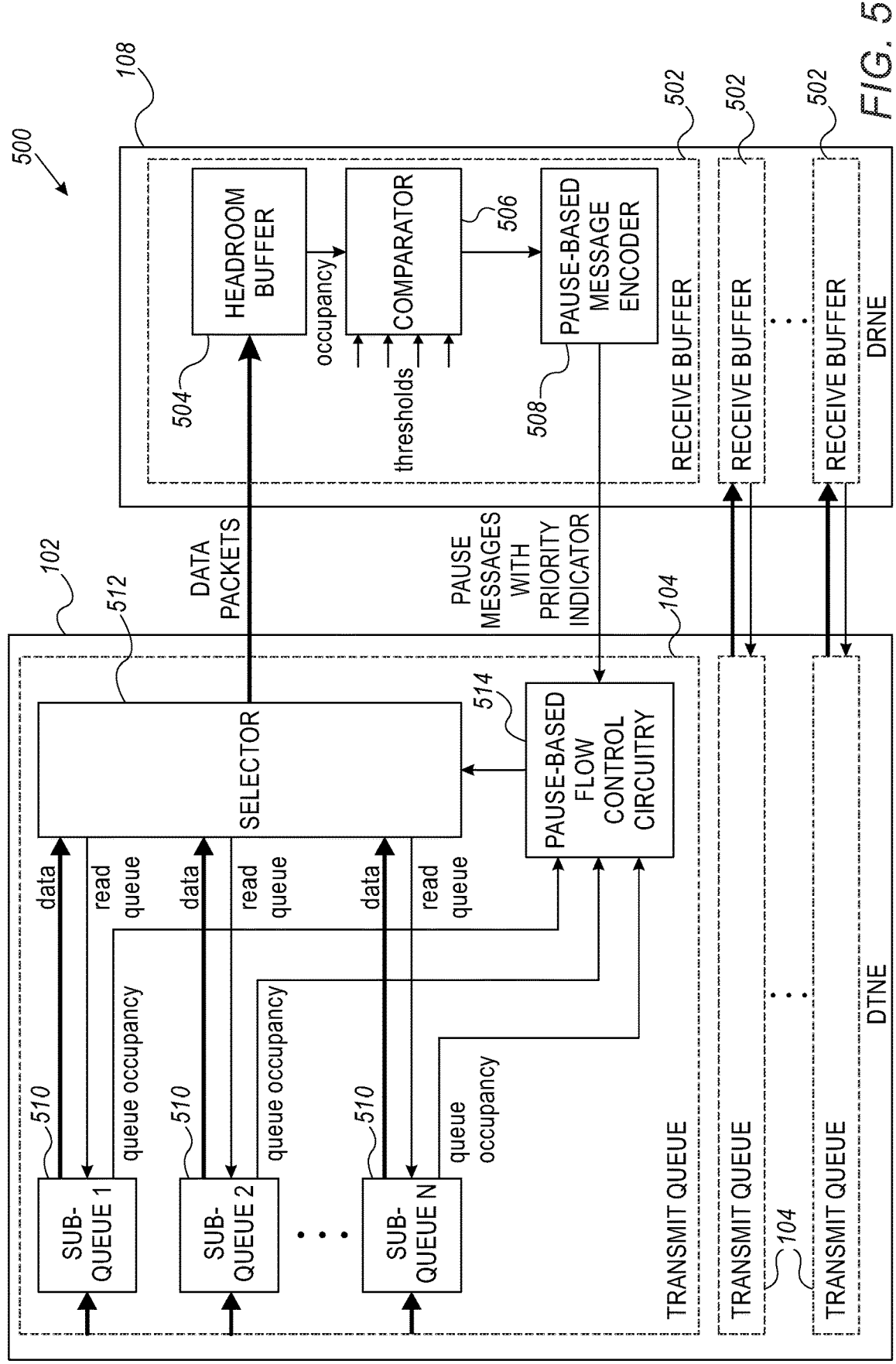
FIG. 5 is a block diagram that schematically illustrates pause-based data transfer between two network elements, in accordance with an embodiment of the present invention.

FIG. 5 is a block diagram 500 that schematically describes Pause-based data transfer between two network elements, in accordance with an embodiment of the present invention. A DTNE 102 (FIG. 1) comprises up to eight Transmit Queues 104 that send data packets to a DRNE 108. The DRNE comprises Receive Buffers 502, one for each Transmit Queue 104.

Each Receive Buffer 502 comprises a Headroom Buffer 504 that stores data packets that the corresponding Transmit Queue sends. A Comparator 506 compares the headroom buffer occupancy to a set of thresholds, one for every sub-priority, and a Pause-Message-Encoder 506 converts the comparison result to control packets that signal prioritized pause requests (or, if the headroom buffer occupancy is lower than the first threshold, no Pause request message will be signaled). For example, the comparator may indicate that the headroom buffer occupancy is between threshold n and threshold n+1 from an ascending group of m thresholds, and, responsive to this indication, the Pause Message Encoder may build a packet that comprises a Pause Message that indicates to the corresponding Transmit Queue that messages from sub-priorities lower then n should be Paused (for the sake of generalization, the control packet will be sometimes referred to as pause-request signaling).

As would be appreciated, high headroom buffer occupancy may indicate congestion, which grows in severity as the occupancy reaches the buffer capacity. The occupancy is sometimes referred to as congestion-severity measure. By comparing the congestion severity to thresholds, comparator 506 determines which sub-priorities the Transmit Queue should pause.

Each Transmit Queue 104 comprises a plurality of Sub-Queues 510, which temporarily store data from external sources with varying sub-priorities; a Selector 512, which reads data packets from the Sub-Queues and forwards the data packets to the DRNE; and, a Pause-Based-Flow-Control-Circuit (PBFCC) 514.

The PBFCC is configured to receive the pause request signaling from the corresponding Receive Buffer and, responsive to the pause requests and to the occupancies of the sub-queues, control the Selector to read a data packet from one of the Sub-Queues and forward the packet to the corresponding Receive Buffer.

The selection logic that the PBFCC applies may be, for example:

A—pre-select sub-queues with sub-priority higher or equal to the sub-priority indicated in the pause request message (if no pause request is received—pre-select all sub-queues);

B—from the pre-selected sub-queues, select the sub-queue with the highest occupancy.

C—select none if all the pre-selected sub-queues are empty.

In summary, according to the example embodiment illustrated in FIG. 5, a DRNE may generate pause request packets with sub-priority information, responsive to the occupancy of the headroom buffer, for each of the Transmit Queues of the peer DTNE. The DTNE is configured to stop, in response to pause requests, only the indicated sub-priorities.

As would be appreciated, the configurations of Transmit-Queue 104 and Receive Buffer 502 are example configurations that are depicted purely for the sake of conceptual clarity. Other suitable configurations may be used in alternative embodiments of the present invention.

In an alternative embodiment, comparator 506 is not implemented in receive buffer 512, and Pause-Based Message Encoder 508 sends the congestion-severity measure with the pause request signaling. Pause-Based Flow Control Circuitry 514 may then decide which sub-priorities should be paused, based on the congestion-severity measure and on other criteria; e.g., the occupancies of the sub-queues.

In some embodiments, data flow order may change, so that a selector will select data packets from one of the sources, and a single Transmit Queue will be used. In some embodiments, the data sources may comprise net data, and the Transmit Queue may incorporate packetizing logic, which adds headers and footers to create packets.

The selection logic employed by the PBFCC may vary. For example, from the pre-selected sub-queues, the FBFCC, in some embodiments, will select the sub-queue with the highest priority (if the sub-queue Is not empty).

In some embodiments, a unified headroom buffer serves all Receive Buffers 502. In an embodiment, the pause request packet comprises the occupancy of the headroom buffer only, and the Transmit Queue compares the occupancy with thresholds, to determine which sub-queues should be forwarded to the DRNE. In some embodiments some or all the thresholds are fixed, in other embodiments some or all the thresholds may be reprogrammed, in yet other embodiments the transmit queue adjusts some or all the thresholds during run-time, responsive, for example, to congestion statistics.

In the descriptions hereinabove, DTNE 102, DRNE 108 and parts thereof, like Transmit Queue 104 and Receive Buffer 502, have been described in two different manners, one for credit-based transmissions and one for pause-based transmissions. Embodiments according to the present invention include both pause-based and credits-based DTNEs and DRNEs. In some embodiments, DTNEs and/or DRNEs may be configured for both credit-based and pause-based operation, selected by a configuration input or by software control.

In some embodiments, the total number of priorities is less than the maximum (eight) allowed by IEEE or VL, and the disclosed techniques are used to decrease the number of buffers; for example, if eight priority levels are needed, two virtual lanes and two associated transmit and receive buffers may be used, each with four sub-priorities. In some other embodiments, more than eight total priorities are needed and an expanded DL or IEEE architecture (or any other suitable architecture) with more than eight priorities is used; yet only eight (or less) Tx and Rx buffers are implemented, using sub-priorities according to the disclosed techniques.

The configurations of DTNE 102 and DRNE 108 are example configurations that are shown purely for the sake of conceptual clarity. Any other suitable configurations can be used in alternative embodiments. DTNE 102 and/or DRNE 108 may comprise, for example, a communication switch, a router, a server with switching capabilities or aggregation of network elements. The different sub-units of DTNE 102 and DRNE 108 may be implemented using suitable hardware, such as in one or more Application-Specific Integrated Circuits (ASICs) or Field-Programmable Gate Arrays (FPGAs), using software, using hardware, or using a combination of hardware and software elements.

DTNE 102 and/or DRNE 108 may comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   a transmit-queue for transmitting packets from at least two sources, each source having a predefined sub-priority level different from the sub-priority levels of the other of the at least two sources, to a headroom buffer in a peer network element, such that the transmit-queue transmits packets of a plurality of different sub-priority levels; and
   flow-control circuitry, configured to
      receive from the peer network element signaling that indicates a number of credits for transmitting packets to the peer network element;
      manage a current number of credits available for transmission from the transmit-queue, responsive to the signaling;
      select a threshold priority based on the current number of credits for the transmit-queue; and
      transmit packets associated with data sources of the transmit-queue that are higher in sub-priority level than the threshold priority, and refrain from transmitting other packets associated with the transmit-queue.

2. The network element according to claim 1, comprising at least two transmit queues having different priority levels, wherein each of the at least two queues transmits packets of a plurality of different sub-priority levels, wherein the flow-control circuitry is configured to perform the acts of receive, manage, select and transmit for each of the at least two transmit queues.

3. The network element according to claim 2, wherein the flow-control circuitry receives from the peer network element signaling that indicates a separate number of credits for each of the at least two transmit queues.

4. The network element according to claim 3, wherein the flow-control circuitry receives a single control packet with signaling that indicates the separate number of credits for each of the at least two transmit queues.

5. The network element according to claim 3, wherein the flow-control circuitry receives the signaling that indicates the separate number of credits for each of the at least two transmit queues in separate control packets for each of the at least two transmit queues.

6. The network element according to claim 1, wherein the flow-control circuitry is configured to select the threshold priority responsive to comparison of the current number of credits to a plurality of credit thresholds.

7. A method for communication, comprising:
   using at least one transmit-queue in a network element, transmitting packets from at least two sources to a headroom buffer in a peer network element, each source having a predefined sub-priority level different from the sub-priority levels of the other of the at least two sources, such that the transmit-queue transmits packets of a plurality of different sub-priority levels;
   receiving from the peer network element signaling that indicates a number of credits for transmitting packets to the peer network element;
   manage for at least one specific one of the at least one transmit-queue, a current number of credits available for transmission from the at least one specific transmit-queue, responsive to the signaling;
   selecting a threshold priority based on the current number of credits for the at least one specific transmit-queue; and
   for the at least specific transmit-queue, transmitting packets associated with data sources of the at least one specific transmit-queue that are higher in sub-priority level than the threshold priority, and refraining from transmitting other packets associated with the at least one specific transmit-queue.

8. The method according to claim 7, wherein the at least one transmit-queue comprises at least two transmit queues, and wherein the receiving, managing, selecting and transmitting are performed for each of the at least two transmit queues.

9. The method according to claim 8, wherein receiving signaling that indicates a number of credits for transmitting packets comprises receiving from the peer network element signaling that indicates a separate number of credits for each of the at least two transmit queues.

10. The method according to claim 9, wherein receiving from the peer network element signaling that indicates a separate number of credits for each of the at least two transmit queues comprises receiving a single control packet with signaling that indicates the separate number of credits for each of the at least two transmit queues.

11. The method according to claim 9, wherein receiving from the peer network element signaling that indicates a separate number of credits for each of the at least two transmit queues comprises receiving the signaling that indicates the separate number of credits for each of the at least two transmit queues in separate control packets for each of the at least two transmit queues.

12. A method for communication, comprising:
using at least one transmit-queue in a network element, transmitting packets from at least two sources, each source having a predefined sub-priority level different from the sub-priority levels of the other of the at least two sources, to a headroom buffer of a peer network element, such that the transmit-queue transmits packets of a plurality of different sub-priority levels;
receiving from the peer network element pause-request signaling that specifies a congestion severity measure and a specific transmit-queue; and
responsive to the pause-request signaling, selecting a threshold priority based on the congestion severity measure, and stopping transmitting packets that (i) are associated with the data sources of the specific transmit-queue and (ii) have sub-priorities that are lower than the threshold priority, while continuing to transmit packets of the specific transmit-queue with sub-priorities higher than the threshold priority.

13. The method according to claim 12, wherein the congestion severity measure comprises an occupancy of the headroom buffer.

* * * * *